Patented July 5, 1927.

1,634,348

UNITED STATES PATENT OFFICE.

ARNOLD K. BALLS, OF PHILADELPHIA, PENNSYLVANIA.

PROCESS FOR PRESERVING CANE JUICE.

No Drawing. Original application filed January 24, 1924, Serial No. 688,307. Divided and this application filed July 30, 1926. Serial No. 126,089.

This invention relates to yeast culture and more particularly to the preservation of sugar juice used in growing yeast as disclosed in my pending application Serial No. 688,307, filed January 24, 1924, and this case is a division of said application.

In the production of maximum quantities of yeast from sugar cane juice, it will be found necessary to add additional nitrogen and phosphate, in any form, organic or inorganic, which is known to be assimilable by yeast.

In order to increase the amount of available nitrogen in the cane juice itself, recourse may be had to souring, wherein the sugary solution containing unavailable nitrogenous bodies is inoculated with one of the species of lactic acid producing bacilli, and incubated for one or more days at a temperature of about 55° C. This is of added importance if it becomes necessary to keep the juice in storage before using, since the souring process prevents the growth of other organisms.

If it is desired to keep the juice in storage for some days, or even several weeks, it becomes necessary to keep the juice from spoiling. In this contingency, the souring is continued until 100 cc. of this juice contains the titratable equivalent of between 5 and 10 cc. of normal alkali. When concentrations of acid as high as this are reached, the formation of new acid by the lactic bacteria is very slow and finally ceases altogether, unless some neutralizing substance is added to the souring mash, which can be done here but only if the preparation of lactic acid per se is desired, in which case chalk, or similar material is used.

For purposes of preserving the juice, it is necessary to allow the acid formation to proceed until it stops automatically and still maintain the temperature at 55 to 60° C. This combination of high acid concentration and high temperature is an efficient method of preventing infection and spoilage of the product. However, on dilution of this soured material with water, nothing detrimental to yeast growth is found in it. The formation of a small amount of flocculent deposit occurs on heating the fresh juice, which makes any addition of solid matter as a resting place for the lactic acid bacteria unnecessary.

Heretofore the keeping of the cane juice has been considered an impossibility but with the method outlined above the cane juice can be kept against spoilage for a considerable length of time.

While I have described in detail the preferred practice of my process, it is to be understood that the details of procedure may be widely varied without departing from the spirit of this invention or the scope of the subjoined claims.

I claim:

1. The step in the process of preserving cane juice for subsequent use in growing yeast which comprises keeping the juice at a constant temperature of 55° C. in the presence of lactic acid forming bacilli.

2. The process of preserving sugar cane juice for subsequent use in growing yeast which comprises inoculating the material with lactic acid forming micro-organisms, and keeping the acidifying liquid at a temperature of substantially 55° C.

3. The process of preserving sugar cane juice for subsequent use in growing yeast which comprises the souring of the juice, adding chalk thereto, and keeping the liquid at a temperature of substantially 55° C.

In testimony whereof I affix my signature.

ARNOLD K. BALLS.